United States Patent
Duffy et al.

(10) Patent No.: US 10,287,981 B2
(45) Date of Patent: May 14, 2019

(54) SEAL ASSEMBLY WITH COOLING FEATURE

(71) Applicant: UNITED TECHNOLOGIES CORPORATION, Hartford, CT (US)

(72) Inventors: Kevin Duffy, Somers, CT (US); Nasr A. Shuaib, Watertown, MA (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 663 days.

(21) Appl. No.: 14/674,234

(22) Filed: Mar. 31, 2015

(65) Prior Publication Data

US 2015/0275761 A1 Oct. 1, 2015

Related U.S. Application Data

(60) Provisional application No. 61/972,547, filed on Mar. 31, 2014.

(51) Int. Cl.
| | |
|---|---|
| *F02C 1/00* | (2006.01) |
| *F02C 7/06* | (2006.01) |
| *F02C 7/28* | (2006.01) |
| *F02C 7/12* | (2006.01) |
| *F01D 25/18* | (2006.01) |
| *F16J 15/447* | (2006.01) |
| *F01D 25/12* | (2006.01) |
| *F01D 11/00* | (2006.01) |

(Continued)

(52) U.S. Cl.
CPC .............. *F02C 7/06* (2013.01); *F01D 11/003* (2013.01); *F01D 11/005* (2013.01); *F01D 11/02* (2013.01); *F01D 25/125* (2013.01); *F01D 25/183* (2013.01); *F02C 7/12* (2013.01); *F02C 7/28* (2013.01); *F16J 15/4476* (2013.01); *F16C 19/06* (2013.01); *F16C 33/6637* (2013.01); *F16C 33/76* (2013.01); *F16C 2360/23* (2013.01); *Y02T 50/675* (2013.01)

(58) Field of Classification Search
CPC ...... F01D 25/183; F01D 25/186; F01D 11/02; F01D 25/125; F02C 7/06; F02C 7/28; F16C 2360/23; F16C 33/80; F16C 33/768; F05D 2240/50; F05D 2240/55; F05D 2250/185; F05D 2260/20; B65G 39/09; F16J 15/447; F16J 15/4476; F16J 15/4478
USPC .......................... 384/109, 114, 477, 480, 481
See application file for complete search history.

(56) References Cited

U.S. PATENT DOCUMENTS

| | | | |
|---|---|---|---|
| 2,990,202 A * | 6/1961 | Dennison | F01D 11/003 277/385 |
| 3,915,521 A | 10/1975 | Young | |

(Continued)

OTHER PUBLICATIONS

Rotary Seals, Jan. 5, 2012, Roymech.*

*Primary Examiner* — Craig Kim
*Assistant Examiner* — Edwin Kang
(74) *Attorney, Agent, or Firm* — Carlson, Gaskey & Olds, P.C.

(57) ABSTRACT

One exemplary embodiment of this disclosure relates to a gas turbine engine. The engine includes a compressor section, a combustor section, a turbine section, and at least one rotatable shaft. The engine further includes a bearing assembly including an inner race, an outer race, and a plurality of rolling elements. A seal assembly is also included. The seal assembly includes a seal plate mounted for rotation with the rotatable shaft. The seal plate establishes a boundary of a tortuous passageway.

14 Claims, 6 Drawing Sheets

(51) Int. Cl.
*F01D 11/02* (2006.01)
*F16C 33/76* (2006.01)
*F16C 33/66* (2006.01)
*F16C 19/06* (2006.01)

(56) References Cited

U.S. PATENT DOCUMENTS

| | | | |
|---|---|---|---|
| 5,639,096 A * | 6/1997 | Ullah | F16J 15/3404 |
| | | | 277/401 |
| 7,946,590 B2 | 5/2011 | Dobek et al. | |
| 2011/0233871 A1 | 9/2011 | Davis | |
| 2013/0078079 A1 | 3/2013 | LaPierre et al. | |
| 2014/0193243 A1* | 7/2014 | Nallam | F01D 11/02 |
| | | | 415/170.1 |

* cited by examiner

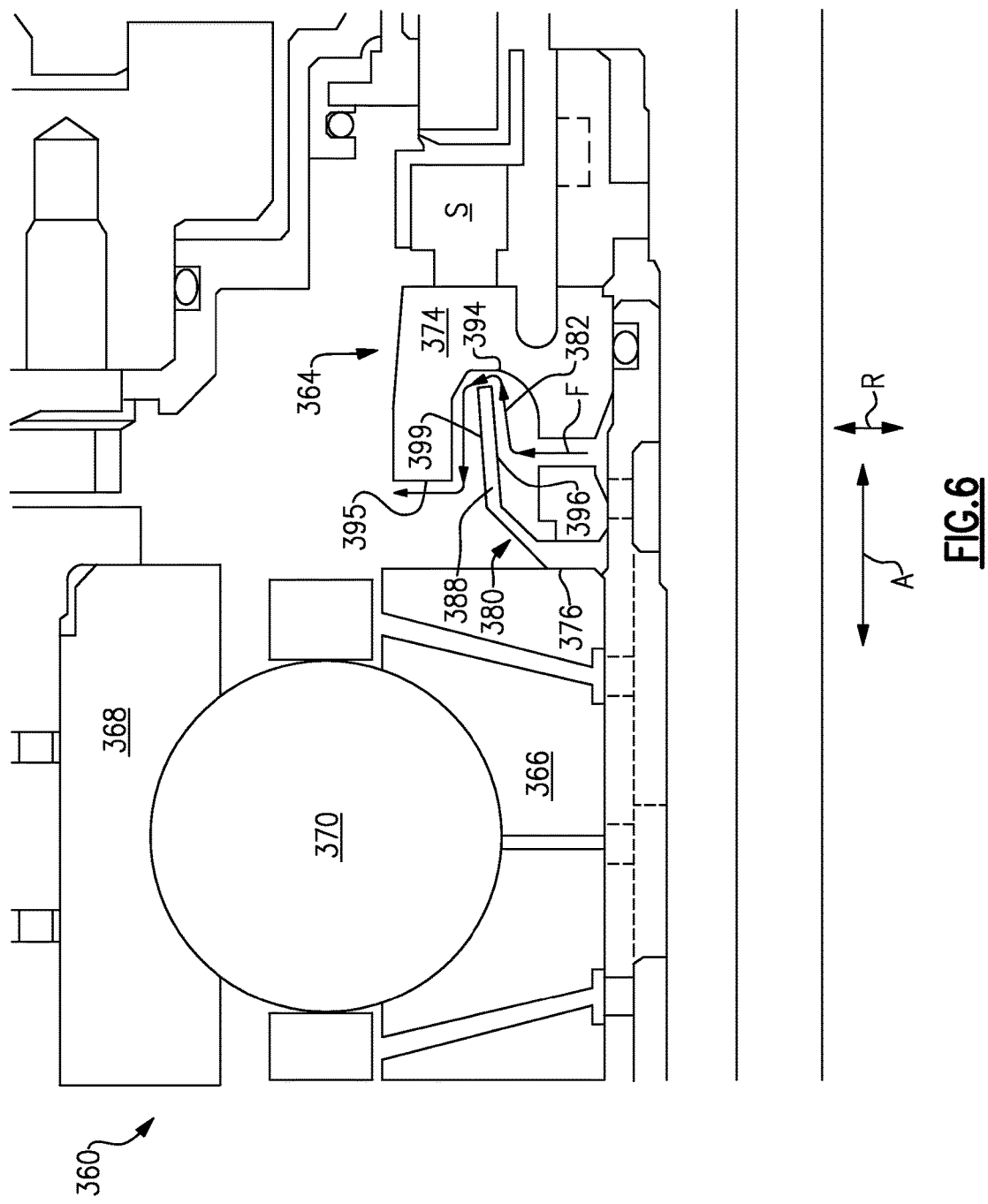

SEAL ASSEMBLY WITH COOLING FEATURE

BACKGROUND

Gas turbine engines include a number of bearing compartments, which include bearing assemblies and seals. During operation of the engine, non-rotating seal faces contact rotating seal plates to maintain compartment pressures and keep lubricating oil inside the compartment. Friction between the sliding surfaces generates heat and exposes the seals to relatively high temperatures.

In the past, carbon materials have been used to increase seal wear life. In other assemblies, such as in U.S. Patent Application Publication No. 2013/0078079, a seal plate is cooled with a flow of cooling fluid, which increases heat transfer away from the seal and reduces seal operating temperature.

SUMMARY

One exemplary embodiment of this disclosure relates to a gas turbine engine. The engine includes a compressor section, a combustor section, a turbine section, and at least one rotatable shaft. The engine further includes a bearing assembly including an inner race, an outer race, and a plurality of rolling elements. A seal assembly is also included. The seal assembly includes a seal plate mounted for rotation with the rotatable shaft. The seal plate establishes a boundary of a tortuous passageway.

In a further embodiment of any of the above, the engine further includes a source of cooling fluid. The seal assembly is arranged such that the cooling fluid flows through the tortuous passageway.

In a further embodiment of any of the above, the seal plate includes a contact face on a first axial end and a projection extending from a second axial end, and the projection establishes a boundary of the tortuous passageway.

In a further embodiment of any of the above, the engine further includes a face seal in contact with the contact face of the seal plate.

Another exemplary embodiment of this disclosure relates to a seal assembly for a gas turbine engine. The seal assembly includes a seal plate at least partially establishing a boundary of a tortuous passageway.

In a further embodiment of any of the above, the seal plate includes a contact face on a first axial end and a projection extending from a second axial end, the projection establishing a boundary of the tortuous passageway.

In a further embodiment of any of the above, the seal assembly further includes a face seal in contact with the contact face of the seal plate.

In a further embodiment of any of the above, the face seal is made of a carbon material.

In a further embodiment of any of the above, the seal assembly further includes a baffle adjacent the seal plate. The baffle includes a projection establishing a boundary of the tortuous passageway.

In a further embodiment of any of the above, the seal plate includes a slot, and the projection of the baffle extends into the slot.

In a further embodiment of any of the above, the seal plate includes a plurality of radially spaced-apart projections, and the baffle includes a plurality of radially spaced-apart projections, the projections of the seal plate and the baffle provided in an alternating arrangement.

In a further embodiment of any of the above, the seal plate includes three projections, and wherein the baffle includes three projections.

In a further embodiment of any of the above, the baffle is a structure formed separately from the seal plate.

A further exemplary embodiment of this disclosure relates to a bearing compartment for a gas turbine engine. The bearing compartment includes a bearing assembly including an inner race, an outer race, and a plurality of rolling elements. The compartment further includes a seal assembly having a seal plate establishing a boundary of a tortuous passageway.

In a further embodiment of any of the above, the seal plate includes a contact face on a first axial end and a projection extending from a second axial end, and the projection establishes a boundary of the tortuous passageway.

In a further embodiment of any of the above, the bearing compartment further includes a face seal in contact with the contact face of the seal plate.

In a further embodiment of any of the above, the bearing compartment further includes a baffle adjacent the seal plate. The baffle includes a projection establishing a boundary of the tortuous passageway.

In a further embodiment of any of the above, the seal plate includes a plurality of radially spaced-apart projections, and the baffle includes a plurality of radially spaced-apart projections. The projections of the seal plate and the baffle are provided in an alternating arrangement.

In a further embodiment of any of the above, the seal plate includes a slot, and the projection of the baffle extends into the slot.

In a further embodiment of any of the above, the baffle is provided by the inner race.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 6 illustrates a fourth example seal assembly.

DETAILED DESCRIPTION

Figure 1:
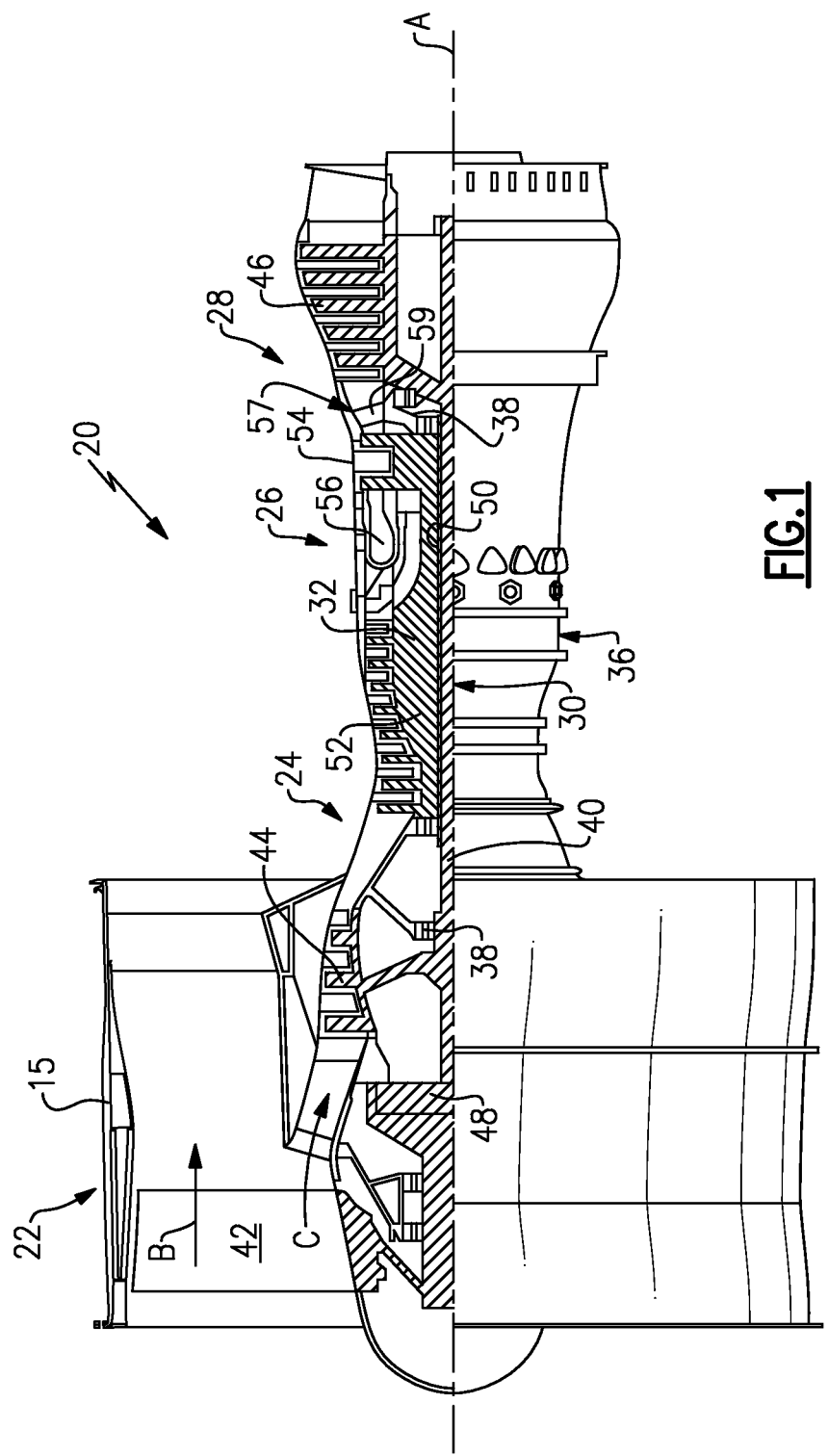
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core airflow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Figure 2:
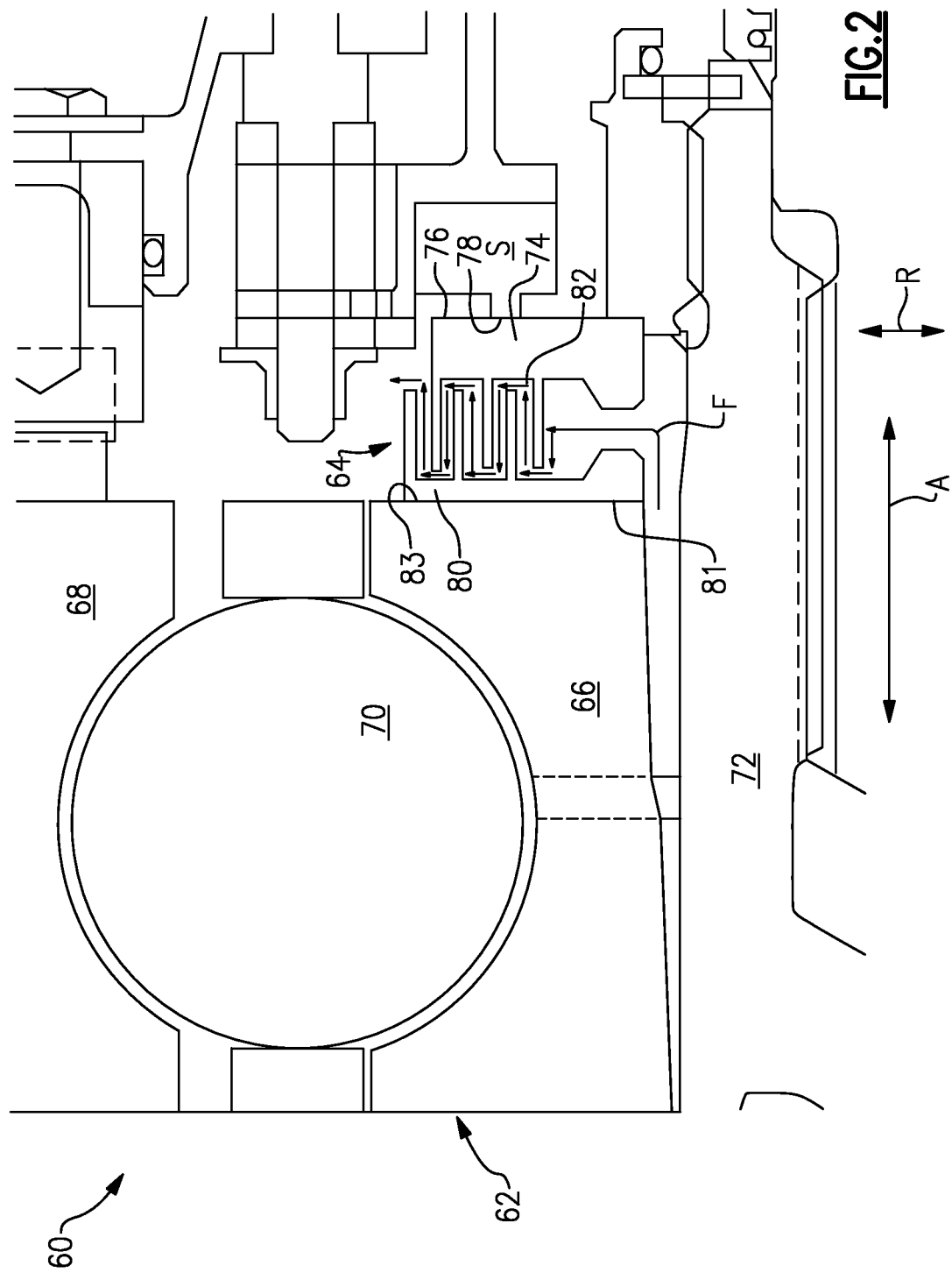
FIG. 2 is a partial cross-sectional view of a bearing compartment of the engine of FIG. 1, and illustrates a first example seal assembly according to this disclosure.

FIG. 2 is a partial cross-sectional view of a bearing compartment 60 of the engine 20. The bearing compartment 60 includes a bearing assembly 62 and a seal assembly 64. As is known in the art, the bearing assembly 62 includes an inner race 66, an outer race 68, and rolling elements, such as balls, 70 configured to roll therebetween. The bearing assembly 62 is mounted relative to a shaft 72 of the engine 20. The shaft 72 serves as a radially inner boundary for the bearing compartment 60.

The bearing compartment 60 is representative of any bearing compartment within the engine 20. Further, the shaft 72 represents either the inner shaft 40 or the outer shaft 50. This disclosure is not limited to bearing compartments at any particular engine location. Further, this disclosure applies outside the context of bearing compartments.

The seal assembly 64 includes a face seal S. In this example, the face seal S is mounted to a static structure, and therefore does not rotate during operation of the engine 20. The face seal S may be made of a carbon (C) material, however other materials come within the scope of this disclosure.

Figure 3:
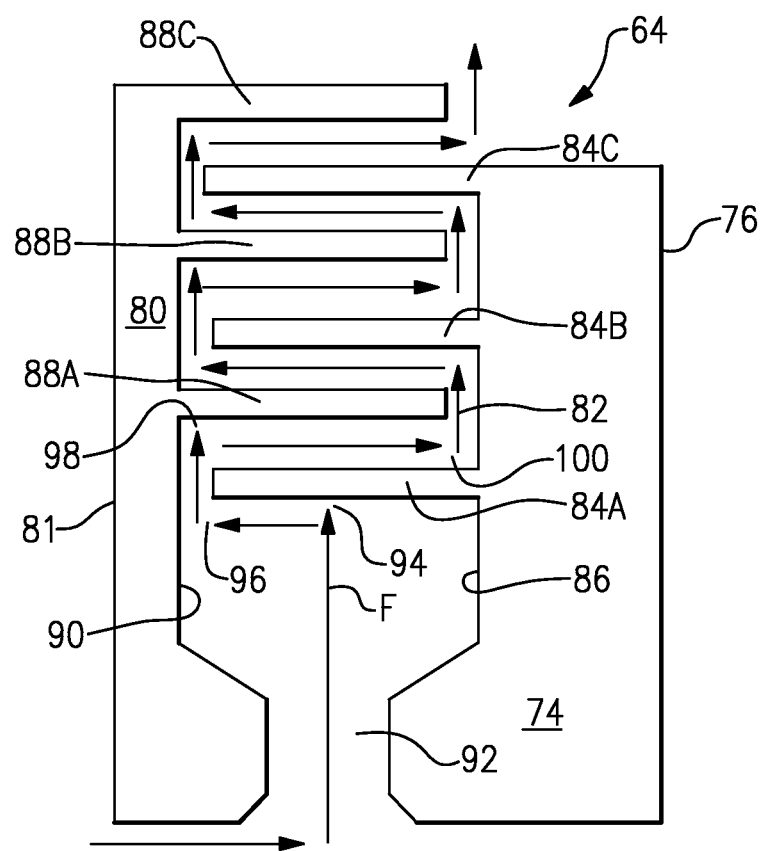
FIG. 3 illustrates the seal plate and baffle of FIG. 2 in insolation for purposes of clarity.
Figure 3:
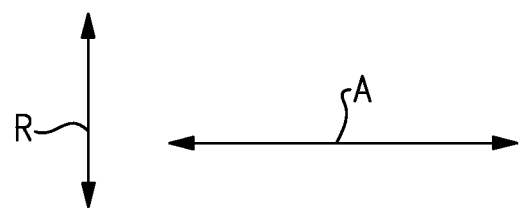

With joint reference to FIGS. 2 and 3, the seal assembly 64 includes a seal plate 74, which has an aft face 76 that directly contacts a fore face 78 of the face seal S. The seal assembly 64 further includes a baffle 80, which, in this example, is formed separately from the seal plate 74. In the illustrated embodiment, the baffle 80 has a fore face 81 that contacts an aft face 83 of the inner race 66. The seal plate 74 and the baffle 80 may be formed of steel, although this disclosure is not limited to any particular material. Further, it should be understood that while one example arrangement is illustrated in FIG. 2, other arrangements come within the scope of this disclosure.

The seal plate 74 and the baffle 80 are both rotatable during operation of the engine 20. As the seal plate 74 rotates, the aft face 76 contacts the fore face 78 of the face seal S, which generates heat. In order to cool the seal plate 74, and, in turn, transfer less heat to the face seal S, the seal assembly 64 includes a tortuous passageway 82 for a cooling fluid F.

The seal plate 74 at least partially establishes a boundary of a tortuous passageway 82. In this example, the seal plate 74 and the baffle 80, together, provide axial boundaries for a tortuous passageway 82. The term "tortuous" is used herein consistent with the ordinary meaning of the term, namely that the passageway 82 has multiple (more than one) turns.

With reference to FIG. 3, the tortuous passageway 82 in this example is formed by a number of radially spaced-apart (relative to the radial direction R, normal to the engine central longitudinal axis A) projections 84A-84C extending from a fore surface 86 of the seal plate 74, and a plurality of radially spaced-apart projections 88A-88C extending from an aft surface 90 of the baffle 80. In this example, the projections 84A-84C and 88A-88C are provided in an alternating arrangement (e.g., moving radially outward, the projections are provided in order of 84A, 88A, 84B, 88B, 84C, 88C). While three projections are illustrated on each of the seal plate 74 and the baffle 80, the seal plate 74 and baffle 80 may have different numbers of projections (such as in the examples of FIGS. 4-6).

During operation of the engine 20, a flow of cooling fluid F, such as oil, is provided from a radially inner location, and initially enters the tortuous passageway 82 at an opening 92 between the seal plate 74 and the baffle 80. The cooling fluid F moves radially outward, in this example, to a first projection 84A of the seal plate 74. The cooling fluid F then turns in an axially fore direction, at 94, and flows toward the aft surface 90 of the baffle 80. Then, at 96, the cooling fluid F turns radially outward and flows toward a first projection 88A of the baffle 80. At this point, the cooling fluid F turns axially, at 98, and flows to the fore surface 86 of the seal plate 74, at 100. The cooling fluid F continues in this manner, flowing over the remaining projections 84B, 84C, 88B, and 88C.

The tortuous passageway 82 increases the contact surface area, and exposure time, between the fluid F and the seal plate 74. This, in turn, enhances cooling and of the seal plate 74, which reduces heat transfer to the face seal S and extends the operating life of the face seal S.

Variations of the seal assembly 64 illustrated in FIGS. 2-3 come with the scope of this disclosure. To the extent not otherwise described or shown, the seal assemblies 164, 264, and 364 of FIGS. 4-6 correspond to the seal assembly 64 of FIGS. 2-3, with like parts having reference numerals pre-appended with a "1," "2," or "3."

Figure 4:
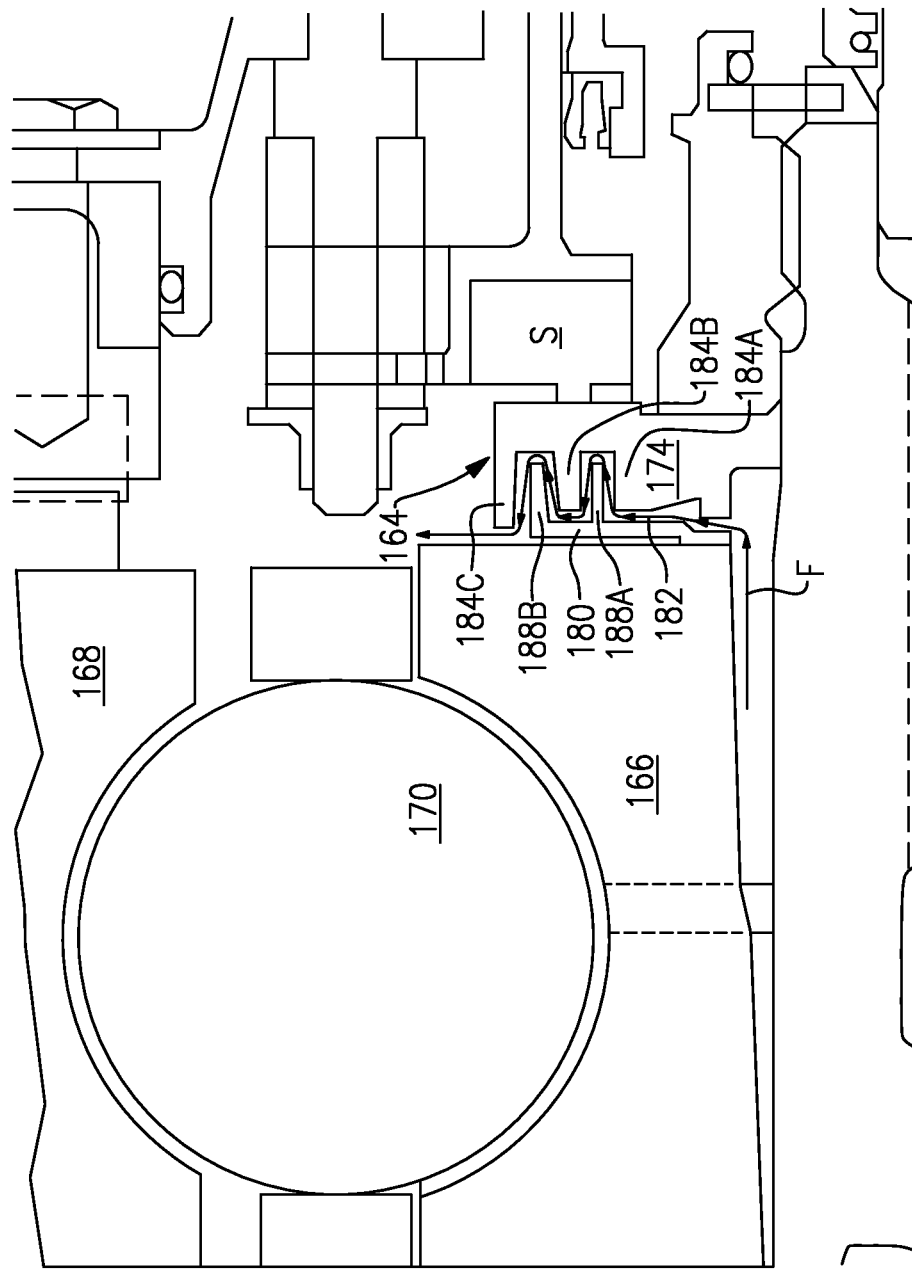
FIG. 4 illustrates a second example seal assembly.

FIG. 4 illustrates an example wherein the seal plate 174 includes three projections 184A-184C, while the baffle 180 includes only three projections 188A-188B. In this example, the tortuous passageway 182 includes one fewer turn than the tortuous passageway 82. However, depending on the application, the seal assembly 164 may still provide adequate cooling.

Figure 5:
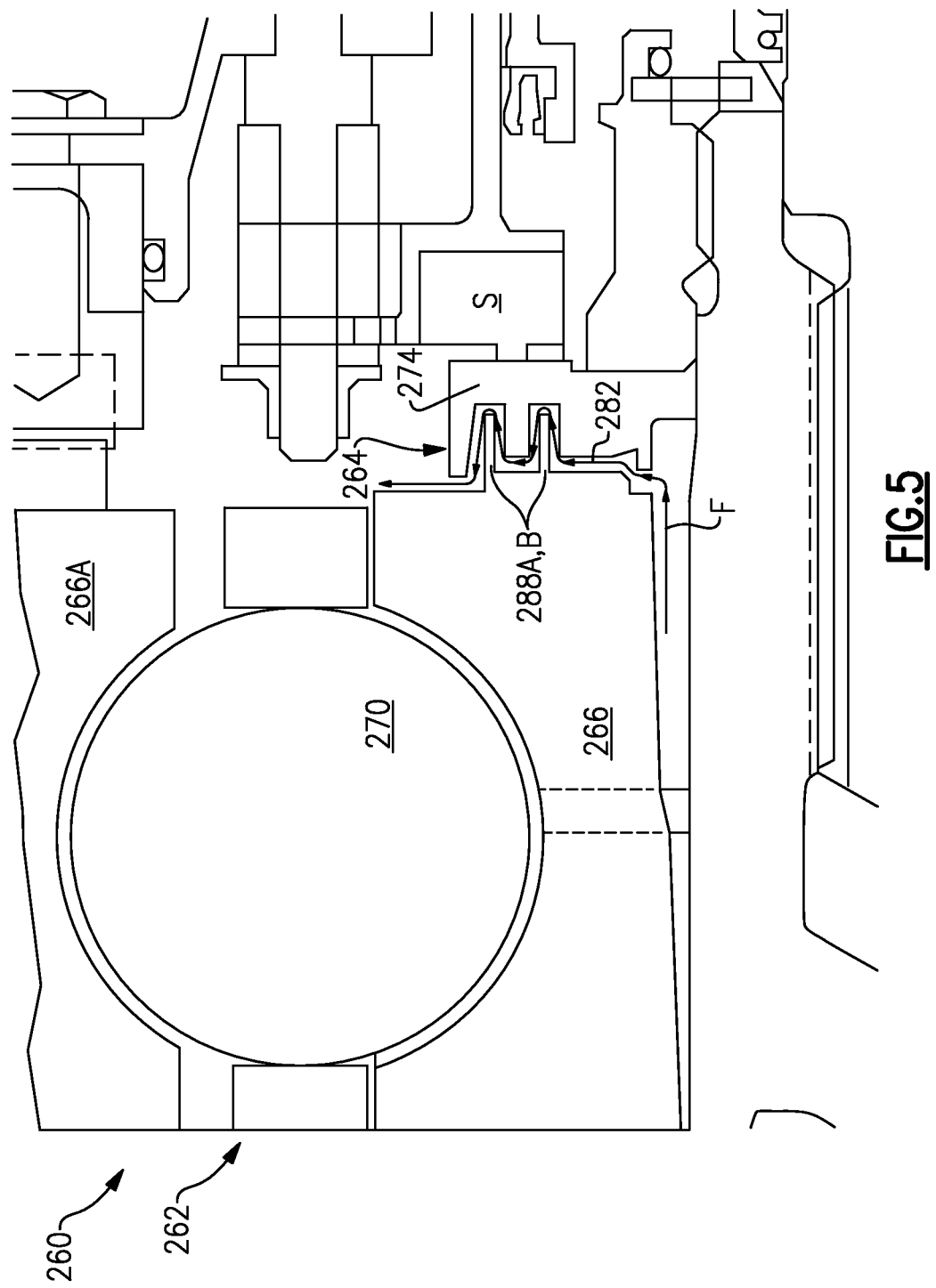
FIG. 5 illustrates a third example seal assembly.

FIG. 5 illustrates another example sealing assembly 264, wherein the tortuous passageway 282 is provided, in part, by projections 288A-288B extending in an aft direction from the inner race 266. In this example, the baffle is provided by the inner race 266, which eliminates the need for an additional, separate baffle.

FIG. 6 illustrates another example bearing compartment 360. In this example, the seal plate 374 includes a slot 394 formed in a fore surface 395 thereof. The tortuous passageway 382 is established by a single projection 388 of the baffle 380, which extends into the slot 394. The projection 388 essentially splits the slot 394 radially in half.

During operation, cooling fluid F flows radially toward the projection 388, and contacts the projection 384 at 396. At that point, the cooling fluid F turns axially aft toward the slot 394. Then, the cooling fluid F follows the contour of the slot 394, and flows around an outer side 399 of the projection 388. Like in the earlier embodiments, the tortuous passageway 382 increases the contact surface area, and exposure time, between the cooling fluid F and the seal plate 374.

It should be understood that terms such as "fore," "aft," "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine, comprising:
   a compressor section, a combustor section, a turbine section, and at least one rotatable shaft;
   a bearing assembly including an inner race, an outer race, and a plurality of rolling elements;
   a seal assembly including a seal plate mounted for rotation with the rotatable shaft, the seal plate establishing a first boundary of a tortuous passageway and including a plurality of radially spaced-apart projections, the projections of the seal plate projecting from the seal plate in a first axial direction substantially parallel to an engine central longitudinal axis, the seal assembly further including a baffle establishing a second boundary of the tortuous passageway and including a plurality of radially spaced-apart projections, the projections of the baffle projecting in a second axial direction substantially parallel to the engine central longitudinal axis and opposite the first axial direction, the projections of the seal plate and the baffle provided in an alternating arrangement; and
   a source of cooling fluid, wherein the cooling fluid flows through the tortuous passageway between adjacent projections of the seal plate and the baffle in one of the first axial direction and the second axial direction.

2. The gas turbine engine as recited in claim 1, further comprising:
   a face seal in contact with a contact face of the seal plate.

3. A seal assembly for a gas turbine engine, comprising:
   a seal plate establishing a first boundary of a tortuous passageway, the seal plate including a plurality of radially spaced-apart projections, the projections of the seal plate projecting from the seal plate in a first axial direction substantially parallel to an engine central longitudinal axis; and
   a baffle establishing a second boundary of the tortuous passageway and including a plurality of radially spaced-apart projections, the projections of the baffle projecting in a second axial direction substantially parallel to the engine central longitudinal axis and opposite the first axial direction, wherein the projections of the seal plate and the baffle are provided in an alternating arrangement.

4. The seal assembly as recited in claim 3, further comprising:
   a face seal in contact with a contact face of the seal plate.

5. The seal assembly as recited in claim 4, wherein the face seal is made of a carbon material.

6. The seal assembly as recited in claim 3, wherein the seal plate includes a slot, and wherein the projection of the baffle extends into the slot.

7. The seal assembly as recited in claim 3, wherein the seal plate includes three projections, and wherein the baffle includes three projections.

8. The seal assembly as recited in claim 3, wherein the baffle is a structure formed separately from the seal plate.

9. A bearing compartment for a gas turbine engine, comprising:
   a bearing assembly including an inner race, an outer race, and a plurality of rolling elements; and
   a seal assembly including a seal plate establishing a first boundary of a tortuous passageway and including a plurality of radially spaced-apart projections, the projections of the seal plate projecting from the seal plate in a first axial direction substantially parallel to an engine central longitudinal axis, the seal assembly further including a baffle establishing a second boundary of the tortuous passageway and including a plurality of radially spaced-apart projections, the projections of the baffle projecting in a second axial direction substantially parallel to the engine central longitudinal axis and opposite the first axial direction, the projections of the seal plate and the baffle provided in an alternating arrangement.

10. The bearing compartment as recited in claim 9, further comprising:

a face seal in contact with a contact face of the seal plate.

11. The bearing compartment as recited in claim 9, wherein the seal plate includes a slot, and wherein the projection of the baffle extends into the slot.

12. The bearing compartment as recited in claim 9, wherein the baffle is part of the inner race.

13. The gas turbine engine as recited in claim 1, wherein ends of the projections of the seal plate are axially spaced-apart from the baffle, and wherein ends of the projections of the baffle are axially spaced-apart from the seal plate.

14. The gas turbine engine as recited in claim 13, wherein the cooling fluid flows between the ends of the projections of the seal plate and the baffle, and wherein the cooling fluid flows between the ends of the projections of the baffle and the seal plate.

* * * * *